US011040598B2

(12) United States Patent
Kim et al.

(10) Patent No.: US 11,040,598 B2
(45) Date of Patent: Jun. 22, 2021

(54) INDUCTION HEATER AND METHOD FOR CONTROLLING OVERHEATING OF INDUCTION HEATER

(71) Applicant: Hanon Systems, Daejeon (KR)

(72) Inventors: Jun Su Kim, Daejeon (KR); Dong Hoon Oh, Daejeon (KR)

(73) Assignee: Hanon Systems, Daejeon (KR)

( * ) Notice: Subject to any disclaimer, the term of this patent is extended or adjusted under 35 U.S.C. 154(b) by 54 days.

(21) Appl. No.: 16/066,908

(22) PCT Filed: Jun. 21, 2017

(86) PCT No.: PCT/KR2017/006541
§ 371 (c)(1),
(2) Date: Jun. 28, 2018

(87) PCT Pub. No.: WO2018/008876
PCT Pub. Date: Jan. 11, 2018

(65) Prior Publication Data
US 2020/0269656 A1 Aug. 27, 2020

(30) Foreign Application Priority Data

Jul. 6, 2016 (KR) .................. 10-2016-0085463
Jul. 6, 2016 (KR) .................. 10-2016-0085496

(51) Int. Cl.
*B60H 1/22* (2006.01)
*B60L 53/122* (2019.01)
(Continued)

(52) U.S. Cl.
CPC ......... *B60H 1/2221* (2013.01); *B60H 1/2226* (2019.05); *B60L 53/122* (2019.02);
(Continued)

(58) Field of Classification Search
CPC ............ B60H 1/00314; B60H 1/00385; B60H 1/00392; B60H 1/034; B60H 1/2215; B60H 1/22; B60H 2001/00128
See application file for complete search history.

(56) References Cited

U.S. PATENT DOCUMENTS 7,059,537 B2 * 6/2006 Parker ................ B60H 1/00264
165/41
7,318,553 B2 * 1/2008 Thoma .................... F24V 40/10
237/12.3 R
(Continued)

FOREIGN PATENT DOCUMENTS

FR       3014542 A1 *  6/2015  ........... F24H 9/0015
JP     2003-104041 A     4/2003
(Continued)

*Primary Examiner* — Daniel E. Namay
(74) *Attorney, Agent, or Firm* — Norton Rose Fulbright US LLP; James R. Crawford

(57) ABSTRACT

The induction heater and a method for controlling overheating of an induction heater, and to an induction heater in which overheating of a heating element may be prevented by allowing a coolant to be introduced from a lower side, flow upwardly while being in contact with the heating element, and be then discharged to an upper side to improve air bubble discharge performance of the coolant, in the induction heater heating a heating element in an induction heating manner. In addition, the present invention relates to an induction heater and a method for controlling overheating of an induction heater in which a fault of the induction heater or a fire due to overheating may be prevented by deciding whether or not a heating element is overheated using one or more of a current sensing means and a temperature sensing means capable of sensing overheating of the heating element and performing a control to supply power to an induction coil or block power supplied to the induction coil depending on a decision result.

15 Claims, 13 Drawing Sheets

(51) Int. Cl.
*H05B 1/02* (2006.01)
*H05B 6/06* (2006.01)
*H05B 6/10* (2006.01)
*H05B 6/36* (2006.01)
*B60H 1/14* (2006.01)

(52) U.S. Cl.
CPC ............ *H05B 1/0236* (2013.01); *H05B 6/06* (2013.01); *H05B 6/10* (2013.01); *H05B 6/36* (2013.01)

(56) References Cited

U.S. PATENT DOCUMENTS

| | | | | |
|---|---|---|---|---|
| 8,047,451 | B2* | 11/2011 | McNaughton | B60S 1/487 237/12.3 B |
| 8,807,446 | B2* | 8/2014 | Han | H01M 8/04268 237/12.3 R |
| 10,286,753 | B2* | 5/2019 | Nagasaka | B60H 1/00978 |
| 2007/0295825 | A1* | 12/2007 | McNaughton | B60S 1/487 237/12.3 B |
| 2008/0223850 | A1* | 9/2008 | Nakao | H05B 6/06 219/618 |
| 2009/0140066 | A1* | 6/2009 | Han | B60L 1/02 237/12.3 R |
| 2013/0015173 | A1* | 1/2013 | Robinson | H05B 1/0236 219/209 |
| 2013/0240503 | A1* | 9/2013 | Herrbach | H05B 1/0236 219/483 |
| 2013/0334193 | A1* | 12/2013 | Nagami | H05B 1/0236 219/202 |
| 2015/0034626 | A1* | 2/2015 | Kominami | B60H 1/2221 219/483 |
| 2015/0129576 | A1* | 5/2015 | Maemura | H05B 1/02 219/494 |
| 2015/0171624 | A1* | 6/2015 | Duarte | B64C 1/1476 361/49 |
| 2015/0272385 | A1* | 10/2015 | Wang | A47J 36/2483 219/627 |
| 2017/0019952 | A1* | 1/2017 | Kim | H05B 6/365 |
| 2017/0021696 | A1* | 1/2017 | Nagasaka | B60H 1/2218 |
| 2019/0037643 | A1* | 1/2019 | Dinh | G01R 33/0017 |
| 2019/0061463 | A1* | 2/2019 | Oh | B60H 1/2221 |
| 2019/0070932 | A1* | 3/2019 | Nakamura | B60H 1/2221 |

FOREIGN PATENT DOCUMENTS

| | | | | |
|---|---|---|---|---|
| KR | 10-0693305 B1 | 3/2007 | | |
| KR | 10-2011-0075118 A | 7/2011 | | |
| KR | 20-0463799 Y1 | 11/2012 | | |
| KR | 10-1578671 B1 | 12/2015 | | |
| KR | 2016-0009962 A | 1/2016 | | |
| WO | WO-2015082434 A1 * | 6/2015 | ........... | F24H 9/0015 |
| WO | 2015137006 A1 | 9/2015 | | |

* cited by examiner

[FIG. 9]
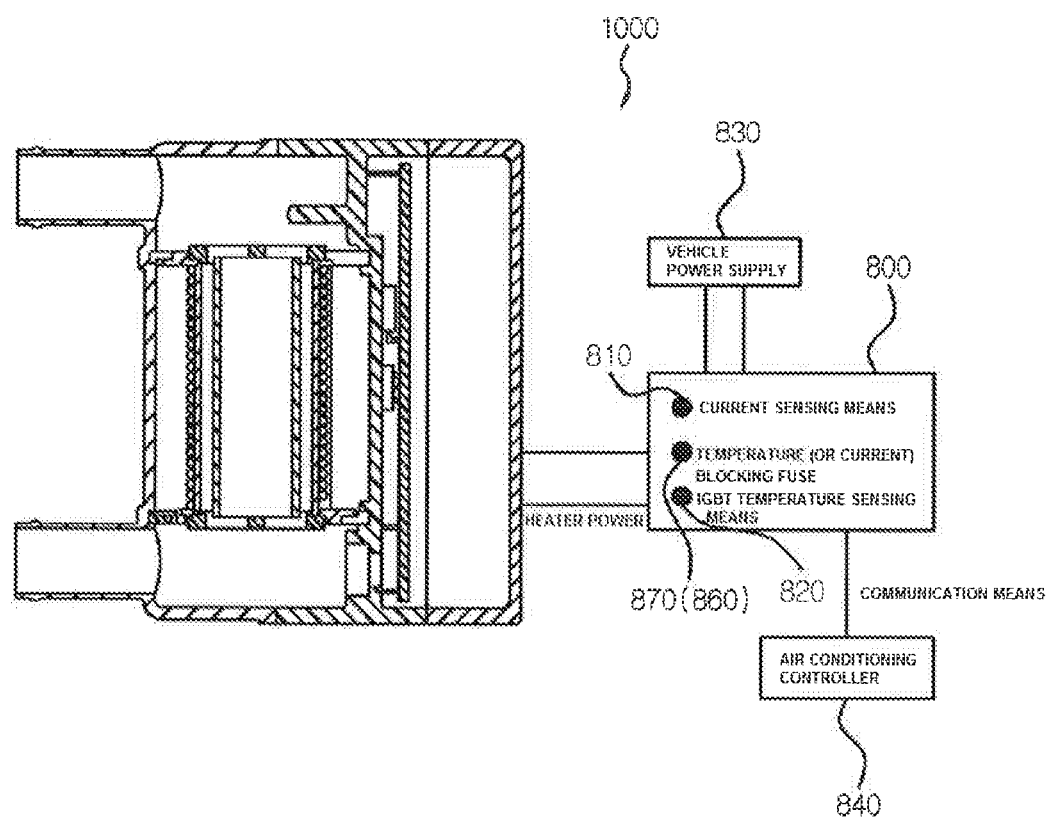

[FIG. 10]
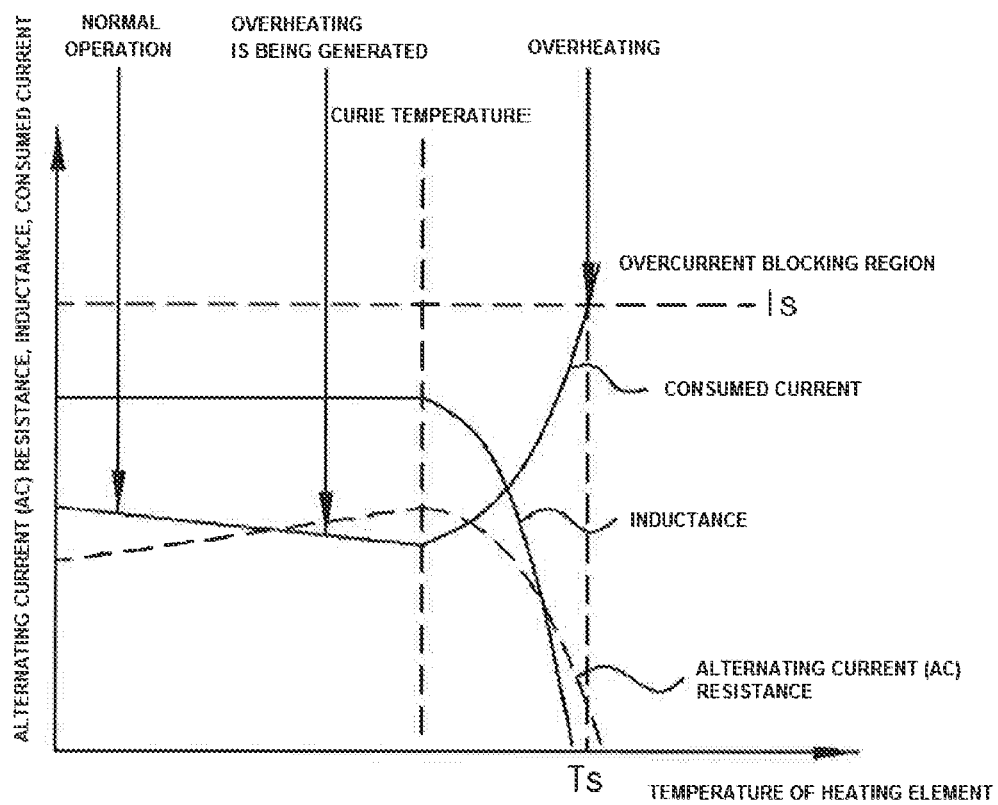

[FIG. 11]
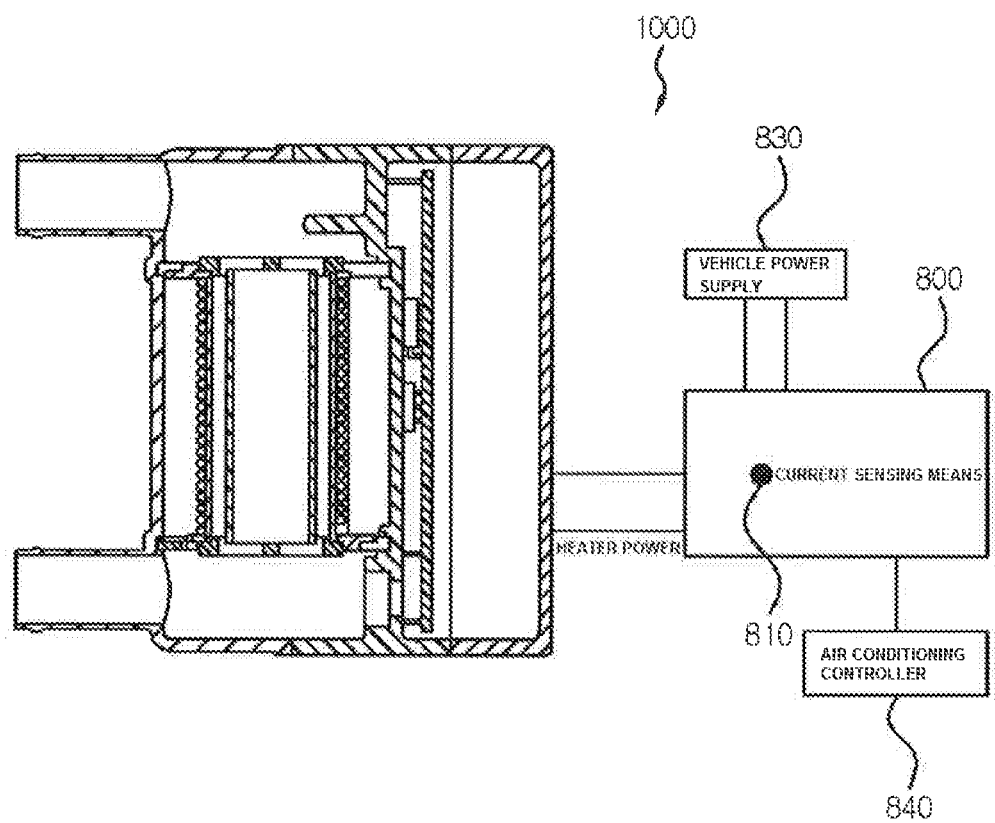

[FIG. 12]
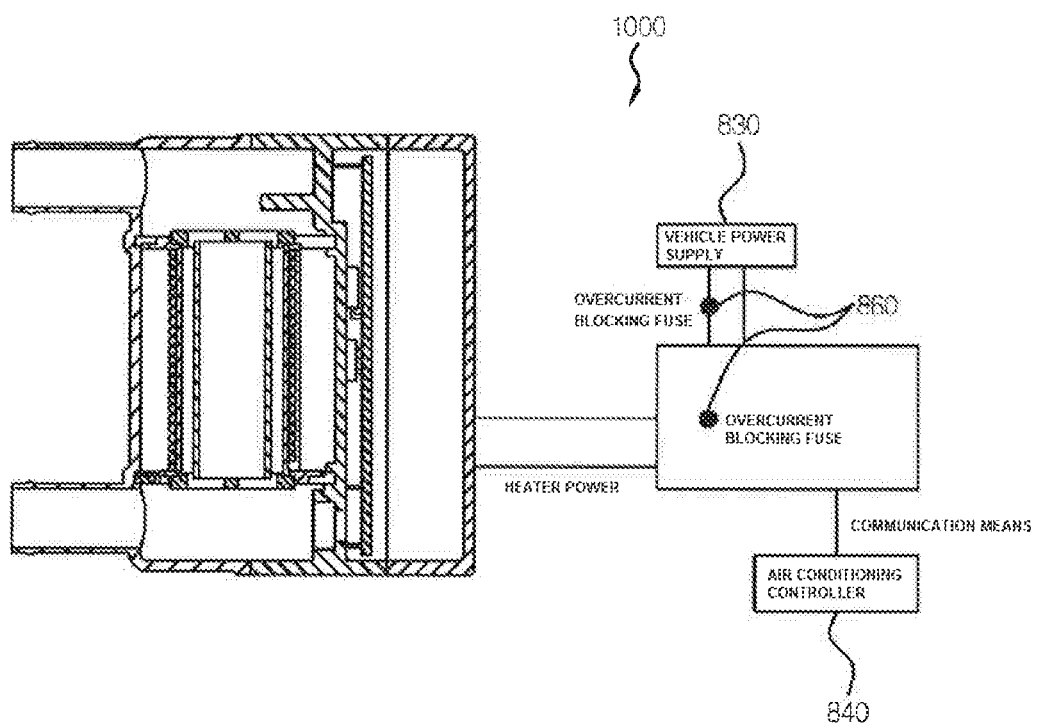

[FIG. 13]
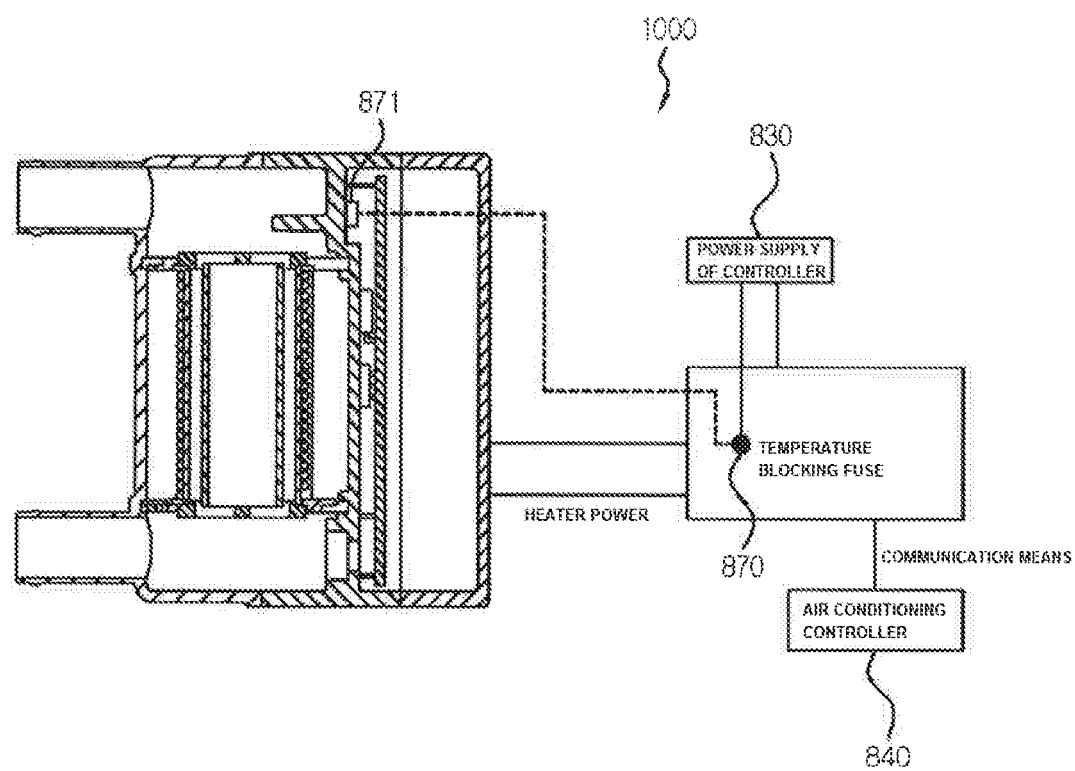

[FIG. 14]
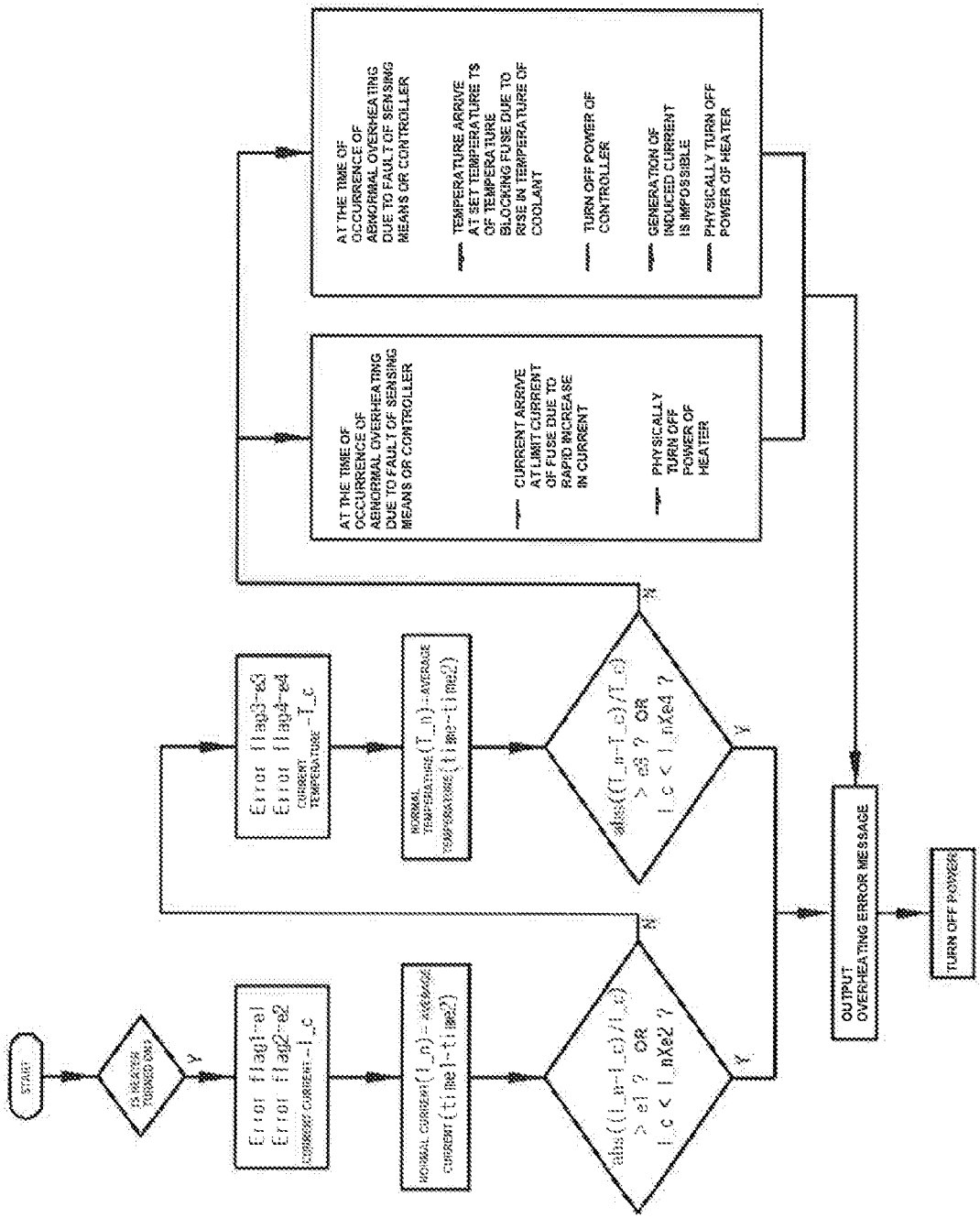

INDUCTION HEATER AND METHOD FOR CONTROLLING OVERHEATING OF INDUCTION HEATER

This application is a § 371 of International Application No. PCT/KR2017/006541 filed Jun. 21, 2017, and claims priority from Korean Patent Application Nos. 10-2016-0085463 filed Jul. 6, 2016 and 10-2016-0085496 filed Jul. 6, 2016. The entire contents of these applications are incorporated herein by reference in their entirety.

TECHNICAL FIELD

The present invention relates to an induction heater and a method for controlling overheating of an induction heater capable of improving air bubble discharging performance of a coolant and preventing overheating of a heating element, an induction coil, and the like, in the induction heater in which the heating element is heated in an induction heating manner.

BACKGROUND ART

Currently, a vehicle having an engine using gasoline, diesel, or the like, as an energy source as a driving source is the most general type of vehicle. However, the necessity for new energy sources has gradually increased due to various causes such as a decrease in oil reserves, and the like, as well as an environmental pollution problem related to such an energy source for a vehicle. Therefore, currently, an electric vehicle, a hybrid vehicle, a fuel cell vehicle, and the like, have been put to practical use or have been developed.

However, in the electric vehicle, the hybrid vehicle, and the fuel cell vehicle, a heating system using a coolant may not be used or it is difficult to use the heating system using a coolant, unlike the vehicle according to the related art that uses the engine using the petroleum as the energy source. That is, in the vehicle according to the related art having the engine using the petroleum as the energy source as the driving source, a large amount of heat is generated in the engine, a coolant circulation system for cooling the engine is provided, and heat absorbed by the coolant from the engine is used to heat the interior of the vehicle. However, since the large amount of heat as generated in the engine is not generated in driving sources of the electric vehicle, the hybrid vehicle, and the fuel cell vehicle, there is a limitation in using such a heating manner according to the related art in the electric vehicle, the hybrid vehicle, and the fuel cell vehicle.

Therefore, several studies on heating technologies of the electric vehicle, the hybrid vehicle, the fuel cell vehicle, and the like, have been conducted. For example, studies on a technology of adding a heat pump to an air conditioning system and using the heat pump as a heat source, a technology of providing a separate heat source such as an electrical heater, or the like, have been conducted. Among them, the electrical heater may more easily heat a coolant without having a large influence on the air conditioning system, and has thus been widely used.

Here, the electrical heater includes an air heating type heater directly heating air blown into the vehicle and a coolant heating type heater (or a coolant heater) heating the coolant.

Among them, an induction type coolant heater according to the related art used in the fuel cell vehicle and heating the coolant is configured so that a high frequency generator 30 is electrically connected to a fuel cell stack 10 generating electric power, and the high frequency generator 30 has a form of a coil wound around a coolant flow pipe 2 formed of a metal, which is a magnetic material, such that an eddy current is generated in the coolant flow pipe 2 by a magnetic field changed when an alternating current (AC) current flows in an induction coil 31 using the electric power of the fuel cell stack 10, and the coolant flow pipe 2 may thus be heated by Joule's heat, thereby heating the coolant passing through the inside of the coolant flow pipe 2, as illustrated in FIGS. 1 and 2.

However, in the induction type coolant heater according to the related art as described above, the coolant introduced into an inlet of the induction type coolant heater generates air bubbles while being in contact with a heating element, and the air bubbles float upward to block a flow of the introduced coolant, such that a flow resistance of the coolant is increased, and heat exchange efficiency is decreased. In addition, the induction type coolant heater according to the related art is disadvantageous to cooling of the heating element due to a decrease in flow distribution of the coolant, and the heating element or components disposed in the vicinity of the heating element may be overheated, such the induction type coolant heater according to the related art is poor in terms of safety.

In addition, since a separate sensing means capable of sensing and controlling the overheating of the induction heater in the case in which the induction heater is overheated is not provided, in the case in which the coolant does not exist, the heating element is rapidly overheated to cause a fault of the induction heater or cause a risk of a fire.

RELATED ART DOCUMENT

Patent Document

KR 10-2011-0075118 A1 (2011.07.06)

DISCLOSURE

Technical Problem

An object of the present invention is to provide an induction heater in which overheating of a heating element may be prevented by improving air bubble discharging performance of a coolant and overheating of the heating element and components disposed in the vicinity of the heating element may be prevented by spacing a bobbin, which is a structure around and to which an induction coil is wound and fixed, and the heating element apart from each other by a sufficient distance and adjusting flow distribution of the coolant, in the induction heater heating the heating element in an induction heating manner.

Another object of the present invention is to provide an induction heater and a method for controlling overheating of an induction heater capable of sensing overheating of the induction heat and controlling the induction heater so as not to be overheated, in the case in which the inductor heat is overheated.

Still another object of the present invention is to provide an induction heater and a method for controlling overheating of an induction heater capable of preventing generation of inductive heating by physically blocking power or physically turning off power of a controller, in the case in which a fault occurs in sensing means sensing overheating of the induction heater or a controller performing a control so that a heating element is inductively heated.

Technical Solution

In one general aspect, an induction heater includes: a body 100; a housing 200 coupled to a side surface of the body 100; an upper header 400 and a lower header 500 provided in an internal space formed by coupling between the body 100 and the housing 200, disposed at upper and lower ends of the internal space, respectively, so as to be spaced apart from each other in a height direction, and coupled to one or more of the body 100 and the housing 200; a bobbin 600 formed in a cylindrical shape and having opened both ends coupled to and supported by the upper header 400 and the lower header 500, respectively; an induction coil 300 wound around the bobbin 600; and a heating element 310 formed in a cylindrical shape, having opened both ends coupled to and supported by the upper header 400 and the lower header 500, respectively, and disposed inside the bobbin 600 so as to be spaced apart from the bobbin 600, wherein a coolant introduced into an inlet pipe 210 formed at a lower side of the housing 200 sequentially passes through a lower side of the lower header 500, a coolant introduction hole 510 of the lower header 500, a space between the heating element 310 and the bobbin 600, a coolant discharge hole 410 of the upper header 400, and an upper side of the upper header 400, and is then discharged through an outlet pipe 220 formed at an upper side of the housing 200.

Guide grooves 110 may be concavely formed in a horizontal direction in a concave inner surface of the body 100, and the upper header 400 and the lower header 500 may be inserted along and coupled to the guide grooves 110.

Fixing grooves 230 may be concavely formed in a horizontal direction in a concave inner surface of the housing 200, and the upper header 400 and the lower header 500 may be inserted and coupled into fixing grooves 230.

The coolant discharge hole 410 formed in the upper header 400 and the coolant introduction hole 510 formed in the lower header 500 may be formed inside the bobbin 600 when viewed from the top or the bottom, and be formed up to an outer peripheral surface of the heating element 310 or beyond the outer peripheral surface of the heating element 310 in an inner radial direction with respect to a position spaced apart from the bobbin 600.

The coolant discharge hole 410 formed in the upper header 400 and the coolant introduction hole 510 formed in the lower header 500 may be formed over an inner region and an outer region of the heating element 310 when viewed from the top or the bottom.

Flow adjusting portions 430 and 530 closing portions of an inner region of the heating element 310 when viewed from the top or the bottom may be formed in the upper header 400 and the lower header 500, respectively.

The bobbin 600 may include coil support portions 620 formed from an outer peripheral surface of a cylindrical portion 610 in an outer radial direction at both ends of the cylindrical portion 610 in a vertical direction.

The bobbin 600 may include protrusion portions 630 protruding from the coil support portions 620 in the height direction, and the protrusion portions 630 may be inserted and coupled into bobbin coupling holes 440 and 540 formed, respectively, in the upper header 400 and the lower header 500.

Bobbin seating grooves 450 and 550 into which the coil support portions 620 of the bobbin 600 are inserted and seated may be formed, respectively, in surfaces of the upper header 400 and the lower header 500 facing each other.

Heating element coupling grooves 460 and 560 into which end portions of the heating element 310 are inserted and coupled may be formed, respectively, in surfaces of the upper header 400 and the lower header 500 facing each other.

In another general aspect, an induction heater includes: an induction coil 300; a heating element 310 inductively heated by the induction coil 300; and an induction heater control device 800 connected to the induction coil 300 and a vehicle power supply 830 to supply power to the induction coil 300 or block power supplied to the induction coil 300 and performing a control so that the heating element 310 is inductively heated, wherein the induction heater control device 800 is configured to include one or more of a current sensor 810 sensing a current flowing in the induction coil 300 and a temperature sensor 820 sensing temperatures of the switching elements (insulated gate bipolar mode transistor (IGBTs)) 730 controlling a current supplied to the heating element 310.

The heating element 310 may be formed of a ferrite-based metal having a Curie temperature.

The temperature sensor 820 of the induction heater control device 800 may be mounted adjacent to a switching element disposed on an upper portion of the substrate 720 or a switching element close to a central portion of the heating element 310.

The induction heater control device 800 may further include an overcurrent blocking fuse 860 mounted on a high voltage line connecting the vehicle power supply 830 and the induction coil 300 to each other.

The induction heater control device 800 may further include a temperature blocking fuse 870 mounted on a low voltage line connected to an operation power supply of a controller performing a control so that the heating element 310 is inductively heated; and a temperature sensing portion 871 connected to the temperature blocking fuse 870 and sensing a temperature of a coolant exchanging heat with the heating element 310.

In still another general aspect, a method for controlling overheating of an induction heater heating a coolant in an induction manner includes: deciding whether or not a heating element 310 is overheated by sensing one or more of temperatures of switching elements (IGBTs) 730 controlling a current flowing in an induction coil 300 and a current supplied to the induction coil 300 (S10); and performing a control to supply power to the induction coil 300 or block the power supplied to the induction coil 300 depending on whether or not the heating element 310 is overheated (S20).

The heating element 310 formed of a ferrite-based metal having a Curie temperature may be used.

When a ratio of a current current Ic to a normal current In becomes smaller than a preset value or is decreased in a ratio larger than a predetermined ratio, it may be decided that the heating element 310 is overheated, and the power supplied to the induction coil 300 may be blocked, the current current Ic being a current consumed current flowing in the induction coil 300, and the normal current In being a consumed current in a normal state supplied to the induction coil 300.

When a ratio of a current temperature Tc to a normal temperature Tn becomes higher than a preset value or is increased in a ratio larger than a predetermined ratio, it may be decided that the heating element 310 is overheated, and the power supplied to the induction coil 300 may be blocked, the current temperature Tc being a current temperature of the switching element 730, and the normal temperature being a temperature of the switching element 730 in a normal state.

When the current flowing in the induction coil 300 arrives at a preset limit current Is, an overcurrent blocking fuse 860 mounted on a high voltage line connecting a vehicle power supply 830 and the induction coil 300 to each other may be broken to block the power supplied to the induction coil 300.

When a temperature of the coolant exchanging heat with the heating element 310 arrives at a preset limit temperature Ts, a temperature blocking fuse 870 mounted on a low voltage line connected to an operation power supply of a controller performing a control so that the heating element 310 is inductively heated may be broken to allow the heating element 310 not to be inductively heated.

Advantageous Effects

In the induction heater according to the present invention, air bubble discharging performance of the coolant may be improved to prevent overheating of the heating element. In addition, the bobbin and the heating element may be spaced apart from each other by a sufficient distance, and a flow of the coolant may be adjusted to be smooth to prevent overheating of the heating element and components disposed in the vicinity of the heating element.

In addition, in the induction heater and the method for controlling overheating of an induction heater according to the present invention, a control may be performed so that the induction heater is not overheated using the current sensor or the temperature sensor capable of sensing the overheating of the heating element, resulting in prevention of a fault of the induction heater or a fire due to the overheating.

Further, in the case in which a fault occurs in the sensing means sensing that the induction heater is overheated or the controller performing a control so that the heating element is inductively heated, the power may be physically blocked or the power of the controller may be physically turned off to allow the inductive heating is not generated, resulting in prevention of the fault of the induction heater or the fire due to the overheating even when the fault occurs in the sensing means or the controller.

DESCRIPTION OF DRAWINGS

FIG. 9 is a configuration diagram illustrating an induction heater including an induction heater control device according to the present invention.

FIG. 10 is graphs illustrating physical property change characteristics depending on a temperature of a heating element according to the present invention.

FIG. 11 is a configuration diagram illustrating an induction heater including a current sensor according to the present invention.

FIG. 12 is a configuration diagram illustrating an induction heater including an overcurrent blocking fuse according to the present invention.

FIG. 13 is a configuration diagram illustrating an induction heater including a temperature blocking fuse according to the present invention.

FIG. 14 is a control algorithm illustrating a method for controlling overheating of an induction heater according to the present invention.

BEST MODE

Hereinafter, an induction heater according to the present invention having the configuration as described above will be described in detail with reference to the accompanying drawings.

Figure 1:
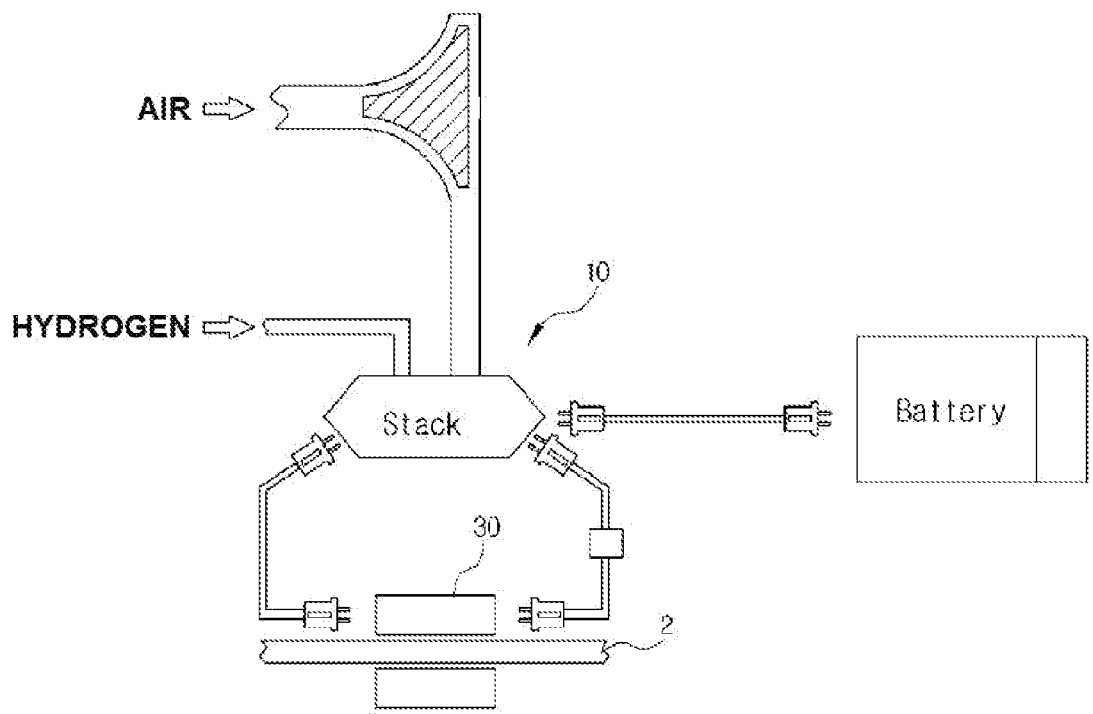
FIGS. 1 and 2 are, respectively, a schematic view and a cross-sectional view illustrating an induction heater according to the related art.
Figure 2:
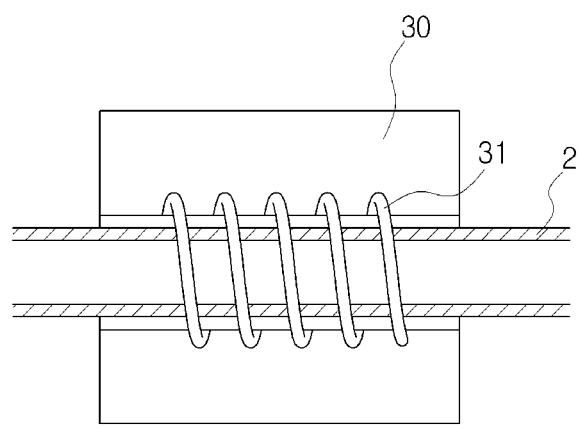
Figure 3:
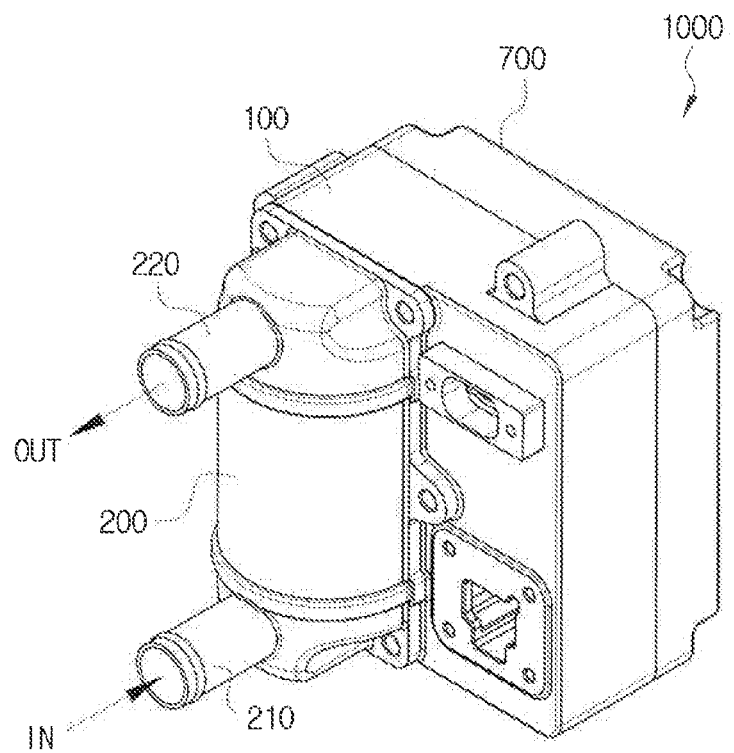
FIGS. 3 and 4 are, respectively, an assembled perspective view and an exploded perspective view illustrating an induction heater according to the present invention.
Figure 4:
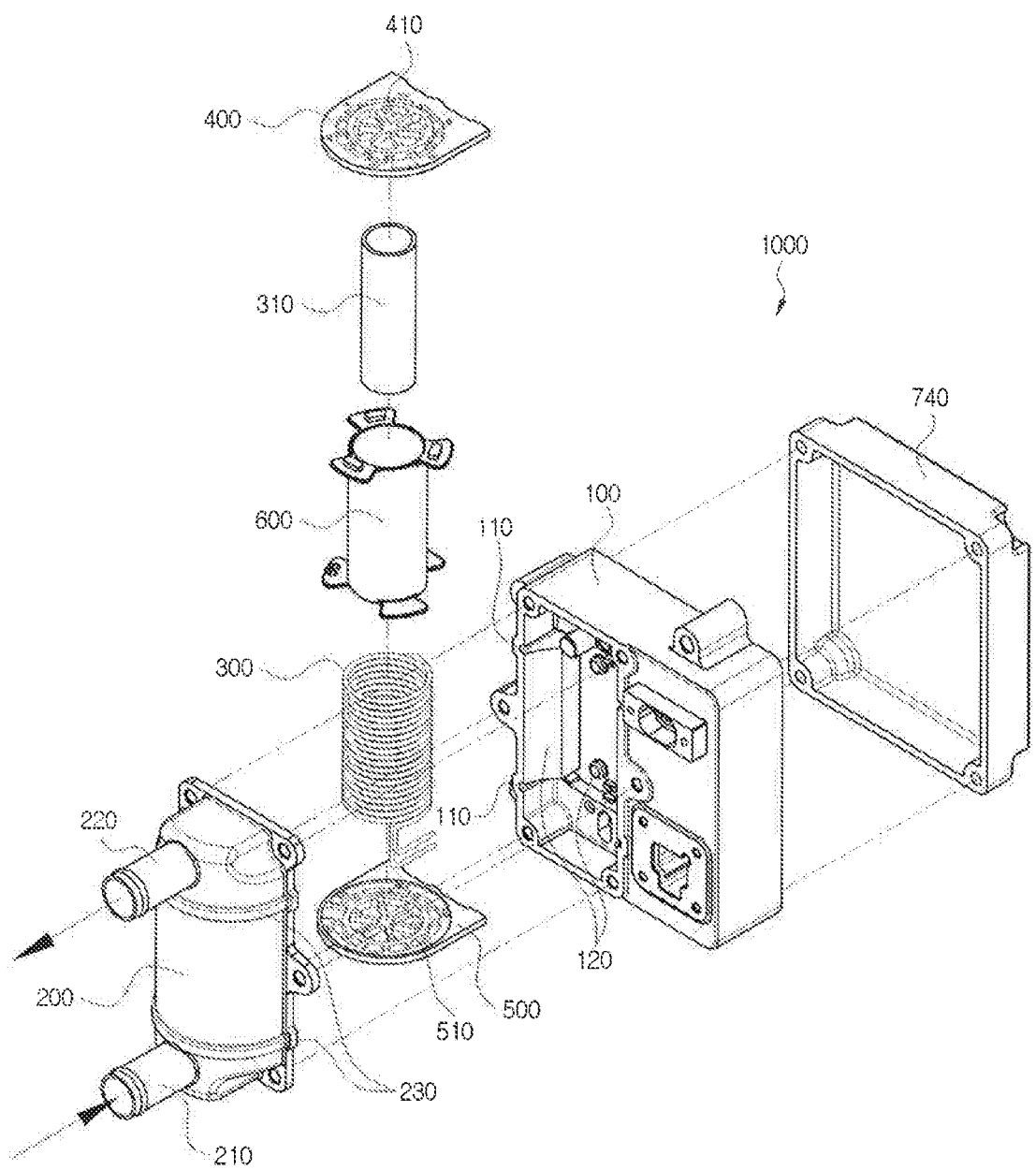
Figure 5:
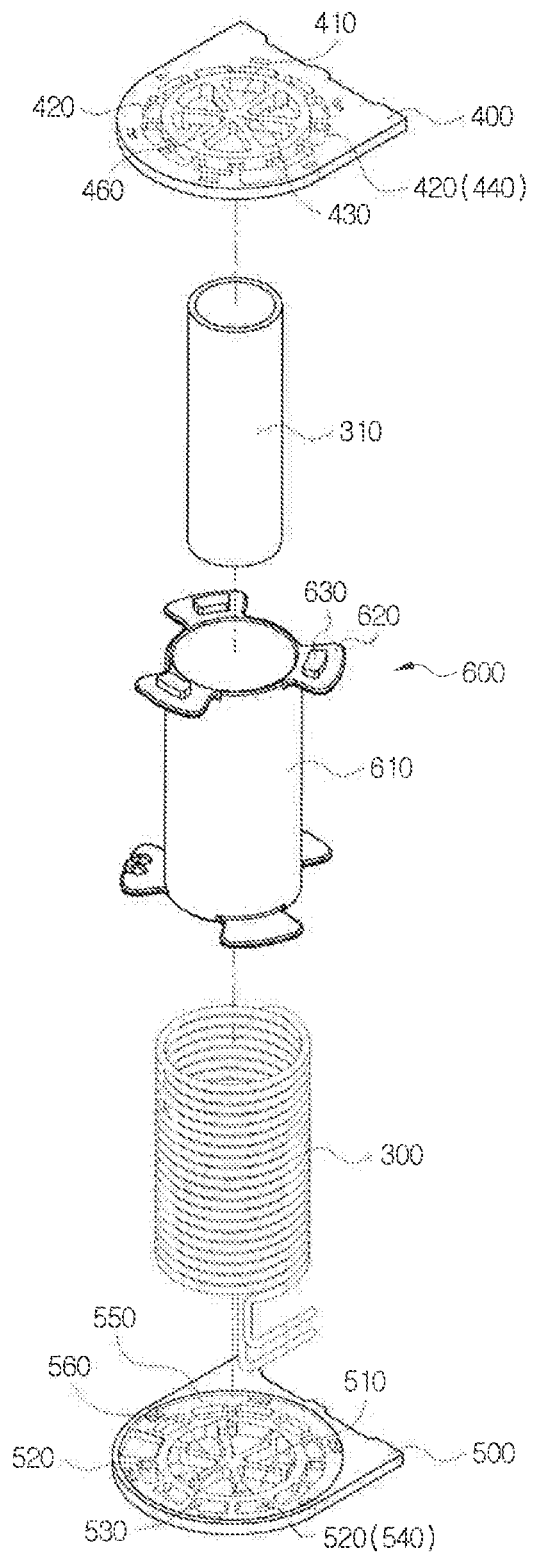
FIGS. 5 and 6 are, respectively, an exploded perspective view and an assembled perspective view illustrating a coupling structure among an upper header, a lower header, a bobbin, an induction coil, and a heating element according to the present invention.
Figure 6:
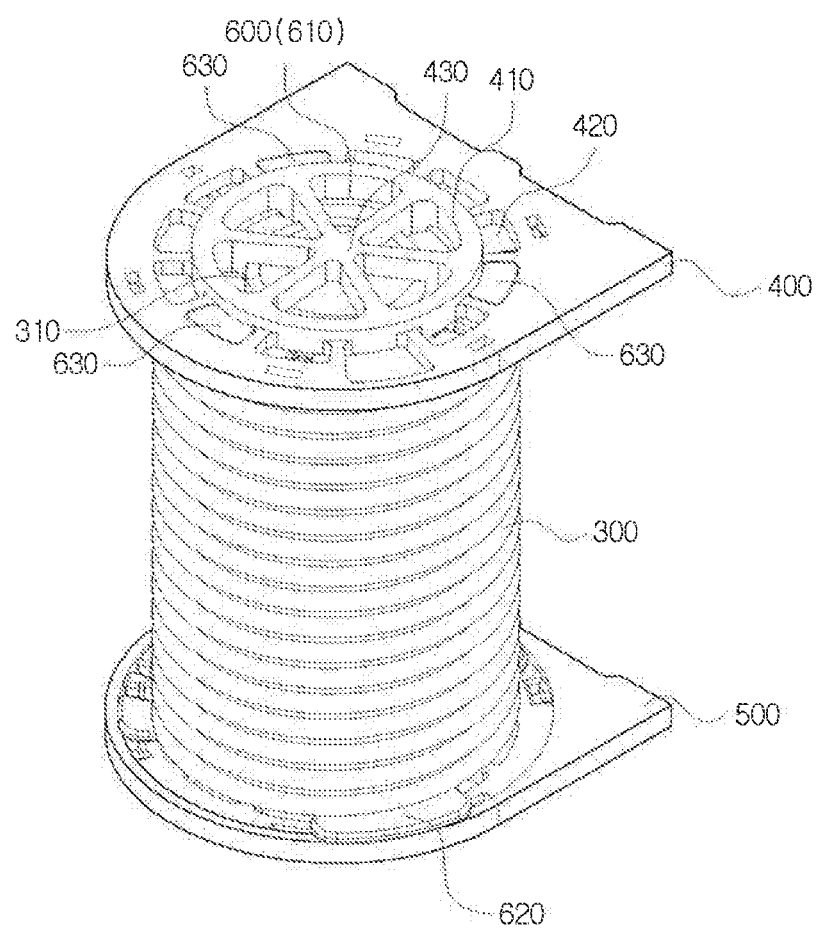
Figure 7:
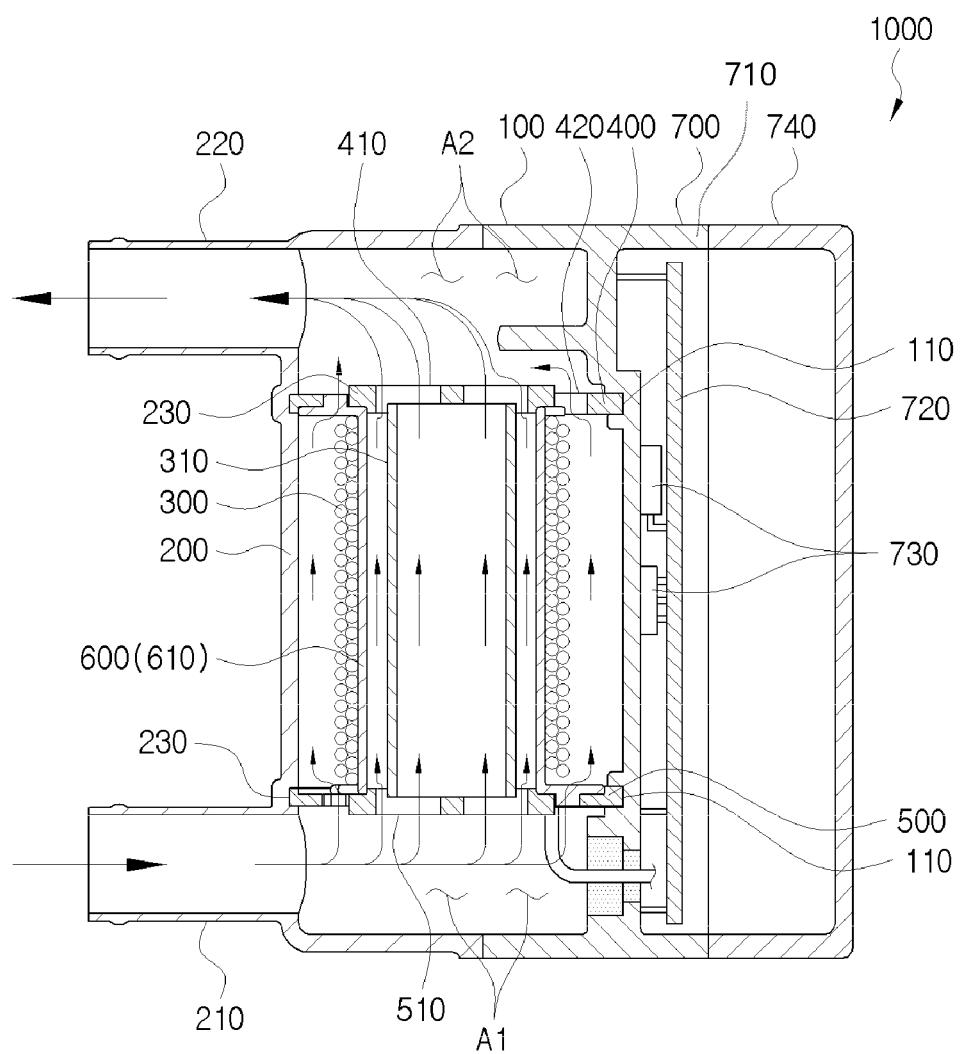
FIG. 7 is a cross-sectional view illustrating the induction heater according to the present invention.

FIGS. 3 and 4 are, respectively, an assembled perspective view and an exploded perspective view illustrating an induction heater according to the present invention, FIGS. 5 and 6 are, respectively, an exploded perspective view and an assembled perspective view illustrating a coupling structure among an upper header, a lower header, a bobbin, an induction coil, and a heating element according to the present invention, and FIG. 7 is a cross-sectional view illustrating the induction heater according to the present invention.

As illustrated, an induction heater 1000 according to an exemplary embodiment of the present invention may be configured to include a body 100; a housing 200 coupled to a side surface of the body 100; an upper header 400 and a lower header 500 provided in an internal space formed by coupling between the body 100 and the housing 200, disposed at upper and lower ends of the internal space, respectively, so as to be spaced apart from each other in a height direction, and coupled to one or more of the body 100 and the housing 200; a bobbin 600 formed in a cylindrical shape and having opened both ends coupled to and supported by the upper header 400 and the lower header 500, respectively; an induction coil 300 wound around the bobbin 600; and a heating element 310 formed in a cylindrical shape, having opened both ends coupled to and supported by the upper header 400 and the lower header 500, respectively, and disposed inside the bobbin 600 so as to be spaced apart from the bobbin 600, wherein a coolant introduced into an inlet pipe 210 formed at a lower side of the housing 200 sequentially passes through a lower side of the lower header 500, a coolant introduction hole 510 of the lower header 500, a space between the heating element 310 and the bobbin 600, a coolant discharge hole 410 of the upper header 400, and an upper side of the upper header 400, and is then discharged through an outlet pipe 220 formed at an upper side of the housing 200.

First, the body 100 is a portion forming the internal space so that the induction coil 300 and the heating element 310 may be provided therein and forming a space in which the coolant may flow, and as an example, one side surface of the body 100 may be inwardly concavely formed as illustrated.

The housing 200 may be coupled to the body 100 so that edge portions thereof in contact with the body 100 are sealed. In this case, the housing 200 has a container form in which a side surface thereof facing the body 100 is opened, such that one side surface of the housing 200 may be inwardly concavely formed. In addition, the inlet pipe 210 may be formed at the lower side of the housing 200, and the outlet pipe 220 may be formed at the upper side of the housing 200. In addition, the induction coil 300 and the heating element 310 as described above may be provided in the internal space. Therefore, portions of the induction coil 300 and the heating element 310 may be disposed in a space close to the body 100, and the other portions of the induction coil 300 and the heating element 310 may be disposed in a space close to the housing 200.

The upper header 400 and the lower header 500, which are used to fix the bobbin 600 around which the induction coil 300 is wound and the heating element 310, may be disposed to be spaced apart from each other in the height direction, and may be coupled and fixed to the body 100 or the housing 200 or be coupled and fixed to both of the body 100 and the housing 200. In this case, the coolant discharge hole 410 penetrating through upper and lower surfaces of the upper header 400 so that the coolant may pass through the upper header 400 may be formed in the upper header 400, and the coolant introduction hole 510 penetrating through upper and lower surfaces of the lower header 500 so that the coolant may pass through the lower header 500 may be formed in the lower header 500. In addition, the upper header 400 may be disposed at a position spaced apart from an upper end of the internal space formed by the coupling between the body 100 and the housing 200 downwardly, and the lower header 500 may be disposed at a position spaced apart from a lower end of the internal space formed by the coupling between the body 100 and the housing 200 upwardly. In addition, the upper header 400 may be disposed below the outlet pipe 220 in the height direction, and the lower header 500 may be disposed above the inlet pipe 210 in the height direction. In addition, the upper header 400 and the lower header 500 may be formed in a plate shape, may be disposed in a horizontal direction, and may be disposed in parallel with each other.

The bobbin 600 is used to fix the induction coil 300, and opened both ends of a cylindrical portion 610 of the bobbin 600 formed of an electrically insulating material and formed in a cylindrical shape may be disposed to face the height direction, such that they may be coupled to the upper header 400 and the lower header 500, respectively. Therefore, the bobbin 600 may be interposed between the upper header 400 and the lower header 500 and be coupled to the upper header 400 and the lower header 500 so as to be vertically closely adhered to the upper header 400 and the lower header 500, and the bobbin 600 may be coupled to and supported by the upper header 400 and the lower header 500, respectively, such that the bobbin may be fixed without being vertically moved.

The induction coil 300 may be formed to be wound around the bobbin 600, may have a form of a coil spring wound plural times and closely adhered. In addition, the induction coil 300 may be formed so that extended lines extended from wound portions of the induction coil 300 penetrate through the body 100 and are then led to the outside of the body 100, and the led extended lines may be electrically connected to a control portion 700 formed at one side of the body 100. In addition, portions in which the extended lines of the induction coil 300 penetrate through the body 100 may be sealed using sealing members such as wire sealing.

The heating element 310, which is a portion that may be inductively heated by the induction coil 300, may be formed of a cylindrical metal, magnetic material, or the like, and may be configured to be heated when an alternating current (AC) current flows in the induction coil 300. In addition, both ends of the heating element 310 may be coupled to and supported by the upper header 400 and the lower header 500, respectively, similar to the bobbin 600. In addition, the heating element 310 may also be formed in the cylindrical shape, and the opened both ends of the heating element 310 may be disposed to face the height direction. In addition, the heating element 310 may be disposed inside the bobbin 600 so as to be spaced apart from the bobbin 600. In this case, the coolant discharge hole 410 and the coolant introduction hole 510 formed in the upper header 400 and the lower header 500, respectively, may be formed to be in communication with an inner side and an outer side of the heating element 310.

In addition, the control portion 700 may be formed at the body 100. As an example, the control portion 700 may be formed at a side of the body 100 opposing a side of the body 100 to which the housing 200 is coupled, as illustrated. In this case, the control portion 700 may include a control portion case 710 formed of a portion of the body 100 concavely formed, a substrate 720 seated and fixed in the control portion case 710, and switching elements 730 coupled to the substrate 720. In addition, a control portion cover 740 may be coupled to an opened side surface of the control portion case 710 so as to cover and seal the opened side surface of the control portion case 710. In addition, the extended lines of the induction coil 300 may be connected to and controlled by the control portion 700.

Therefore, the coolant introduced through the inlet pipe 210 formed at the lower side of the housing 200 may pass through inlet side tank portions A1, which are lower spaces of the lower header 500, and the coolant introduction hole 510 formed in the lower header 500, flow upwardly, exchange heat with the heating element 310 while flowing upwardly through a space between the outer side of the heating element 310 and the bobbin 600, pass through the coolant discharge hole 410 formed in the upper header 400, and be then discharged to the outside through outlet side tank portions A2, which are upper spaces of the upper header 400, and the outlet pipe 220 formed at the upper side of the housing 200.

Therefore, in the induction heater according to the present invention, the coolant may be introduced from the lower side, flows upwardly while being in contact with the heating element, and is then discharged to the upper side. Therefore, air bubbles that may be generated by heating of the coolant by the heating element may flow in a direction in which buoyancy acts along the flow of the coolant and be discharged together with the coolant, such that air bubble discharge performance of the coolant may be improved. Therefore, heat exchange between the coolant and the heating element may be smoothly performed to prevent overheating of the heating element.

In addition, guide grooves 110 may be concavely formed in the horizontal direction in a concave inner surface of the body 100, and the upper header 400 and the lower header 500 may be inserted along and coupled to the guide grooves 100.

That is, the upper header 400 may be inserted into an inner space concavely formed in the body 100 along the guide groove 110 formed in the body 100, and both sides of the upper header 400 in a length direction may be inserted into the guide groove 110, such that movement of the upper header 400 in the height direction may be fixed. In addition, the guide grooves 110 may be concavely formed in both surfaces of the body 100 in the length direction forming the concave inner surface of the body 100, and may also be formed in surfaces of the body 100 in a width direction in the inner surface. In addition, the guide grooves 110 may be concavely formed in the inner surface, but a pair of guide portions that are spaced apart from each other in a vertical direction and protrude may be formed, and the guide groove may be formed between the guide portions. In addition, the guide groove to which the upper header 400 is coupled may be formed at a position spaced apart from an upper surface of the body downwardly in the concave inner surface of the body. Likewise, the lower header 500 may be inserted into an inner space concavely formed in the body 100 along the guide groove 110 formed in the body 100, and both sides of the lower header 500 in the length direction may be inserted into the guide groove 110, such that movement of the lower header 500 in the height direction may be fixed. In addition, the guide groove into which the lower header 500 is inserted and coupled may be formed at a position spaced apart from a lower surface of the body upwardly in the concave inner surface of the body.

Therefore, the upper header 400 and the lower header 500 may be easily coupled and fixed to the body 100. In this case, the bobbin 600 around which the induction coil 300 is wound and the heating element 310 are interposed between the upper header 400 and the lower header 500, the upper header 400, the lower header 500, the bobbin 600 around which the induction coil 300 is wound, and the heating element 310 are assembled together to be coupled to one another to form an assembly, and the upper header 400 and the lower header 500 in the assembly are inserted along and coupled to the guide grooves 110 of the body 100, such that the assembly may be coupled to the body 100.

In addition, fixing grooves 230 may be concavely formed in the horizontal direction in a concave inner surface of the housing 200, and the upper header 400 and the lower header 500 may be inserted and coupled into the guide grooves 100.

That is, the fixing grooves 230 may be concavely formed in the inner surface concavely formed in the housing 200, and one of the fixing grooves 230 may be formed at a position spaced apart from an upper surface of the housing downwardly in the inner surface of the housing and the other of the fixing grooves 230 may be formed at a position spaced apart from a lower surface of the housing upwardly in the inner surface of the housing. Therefore, the upper header 400 and the lower header 500 may be inserted and coupled into the fixing grooves 230. In this case, when the housing 200 is coupled to the body 100 in a state in which the assembly is assembled by fitting one side of the upper header 400 and one side of the lower header 500 into the guide grooves 110 of the body 100 as described above, the other side of the upper header 400 and the other side of the lower header 500 may be fitted and coupled into the fixing grooves 230 of the housing 200, and the upper header 400 and the lower header 500 may thus be firmly firmed so as not to be moved in the horizontal direction and in the vertical direction.

In addition, the coolant discharge hole 410 formed in the upper header 400 and the coolant introduction hole 510 formed in the lower header 500 may be formed inside the bobbin 600 when viewed from the top or the bottom, and may be formed up to an outer peripheral surface of the heating element 310 or beyond the outer peripheral surface of the heating element 310 in an inner radial direction with respect to a position spaced apart from the bobbin 600.

Figure 8:
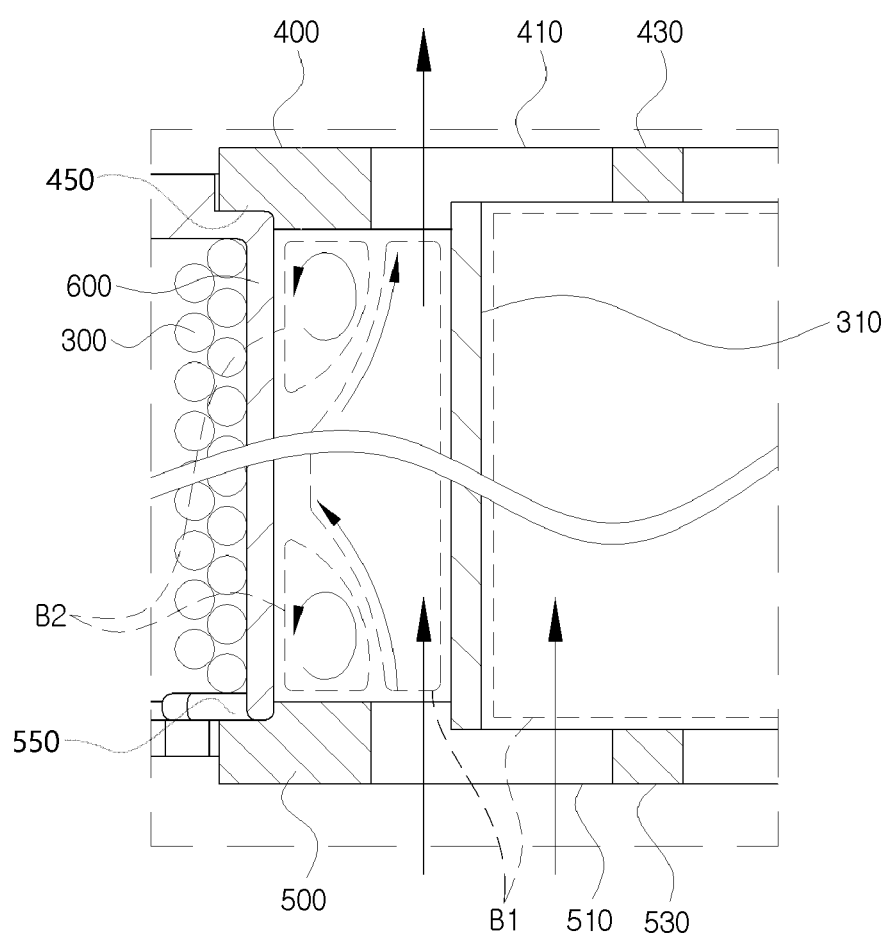
FIG. 8 is a partial cross-sectional view illustrating a flow region of a coolant according to the present invention.

Here, the introduced coolant passes through the coolant introduction hole 510 of the lower header 500, and then simultaneously passes through the inner side and the outer side of the heating element 310. In this case, the coolant passing through the outer side of the heating element 310 passes through a space between an inner peripheral surface of the bobbin 600 and the outer peripheral surface of the heating element 310, and is then discharged through the coolant discharge hole 510 formed in the upper header 400. However, as a distance between the bobbin 600 and the heating element 310 is increased, the bobbin 600 and the induction coil 330 wound around the bobbin are less heated, such that safety of the induction coil 300 may be secured. Therefore, the heating element 310 and the bobbin 600 are spaced apart from each other by a sufficient distance. In this case, when the distance between the bobbin 600 and the heating element 310 is increased, a flow-velocity of the coolant passing through the space between the bobbin 600 and the heating element 310 is decreased, such that a temperature of the heating element 310 may rise, and the heating element 310 may thus be overheated. Therefore, in order to prevent overheating of all of the bobbin 600, the induction coil 300, and the heating element 310 by spacing the heating element 310 and the bobbin 600 apart from each other by the sufficient distance and increasing the flow-velocity of the coolant passing through the space between the bobbin 600 and the heating element 310, the coolant discharge hole 410 and the coolant introduction hole 510 may be formed from the position spaced apart from the bobbin 600 to the outer peripheral surface of the heating element 310 or beyond the outer peripheral surface of the heating element 310 in the inner radial direction with respect to the position spaced apart from the bobbin 600, as described above, when viewing the upper header 400 or the lower header 500 from the top or the bottom. Therefore, as illustrated in FIGS. 7 and 8, the coolant introduced through the coolant introduction hole 410 may rapidly pass through coolant flow regions B1 and be discharged through the coolant discharge hole 510, and particularly, may rapidly pass through a coolant flow region B1 outside the heating element 310. In this case, since upper and lower portions of coolant congestion regions B2 formed adjacent to the coolant flow region B1 outside the heating element 310 are closed, separate rotation flow regions or congested regions are formed while the coolant being rotated in the coolant congestion regions B2. Therefore, it is possible to increase the distance between the bobbin 600 and the heating element 310 and increase the flow-velocity of the coolant exchanging the heat with the heating element 310 while passing through the outer side of the heating element 310, such that the overheating of all of the bobbin 600, the induction coil 300, and the heating element 310 may be prevented.

In addition, the coolant discharge hole 410 formed in the upper header 400 and the coolant introduction hole 510 formed in the lower header 500 may be formed over an inner region and an outer region of the heating element 310 when viewed from the top or the bottom.

That is, as illustrated, when viewed from the top or the bottom, the coolant discharge hole 410 and the coolant introduction hole 510 formed in the upper header 400 and the lower header 500, respectively, may be formed over the inner side and the outer side of the heating element 310 so that the coolant may pass through both of the inner side and the outer side of the heating element 310.

In addition, flow adjusting portions 430 and 530 closing portions of the inner region of the heating element 310 when viewed from the top or the bottom may be formed in the upper header 400 and the lower header 500, respectively.

That is, the flow adjusting portions 430 and 530 may be formed to close the portions of the inner region of the heating element 310 in order to adjust a flow rate of the coolant passing through the inner side and the outer side of the heating element 310. In this case, the flow adjusting portions 430 and 530, which has a circular plate shape as an example, may be formed at a central portion of the inner side of the heating element 310, and may be formed at various sizes.

In addition, the bobbin 600 may include coil support portions 620 formed from an outer peripheral surface of the cylindrical portion 610 in an outer radial direction at both ends of the cylindrical portion 610 in the vertical direction.

That is, as illustrated, the bobbin 600 may include the cylindrical portion 610 vertically penetrated and having the cylindrical shape and the coil support portions 620 protruding from the outer peripheral surface of the cylindrical portion 610 in an outer radial direction at both ends of the cylindrical portion 610 in the vertical direction and having a plate form. In addition, the coil support portions 620 may be formed in the plural to be spaced apart from one another in a circumferential direction. Therefore, the induction coil 300 may be disposed between the coil support portions 620 formed at both ends of the cylindrical portion 610 in the vertical direction, such that separation or movement of the induction coil 300 may be prevented.

In addition, the bobbin 600 may include protrusion portions 630 protruding from the coil support portions 620 in the height direction, and the protrusion portions 630 may be inserted and coupled into bobbin coupling holes 440 and 540 formed, respectively, in the upper header 400 and the lower header 500.

This is to allow the protrusion portions 630 formed in the bobbin 600 to be inserted and coupled into the bobbin coupling holes 440 and 540 formed, respectively, in the upper header 400 and the lower header 500 to firmly fix the bobbin 600 to the upper header 400 and the lower header 500 and prevent the bobbin 600 from being rotated around a central axis in the vertical direction, resulting in prevention of rotation of the induction coil 300. In this case, the protrusion portions 630 may also be formed at an upper end and a lower end of the bobbin 600, and may protrude from the coil support portions 620. In addition, an auxiliary discharge hole 420 and an auxiliary introduction hole 520 may be formed in the upper header 400 and the lower header 500, respectively, in order to cool the induction coil 300 or the protrusion portions 630 may have forms corresponding to the auxiliary discharge hole 420 and the auxiliary introduction hole 520 without forming a separate auxiliary discharge hole and auxiliary introduction hole, such that the auxiliary discharge hole 420 and the auxiliary introduction hole 520 may be replaced with the bobbin coupling holes 440 and 540, respectively.

In addition, bobbin seating grooves 450 and 550 into which the coil support portions 620 of the bobbin 600 are inserted and seated may be formed, respectively, in surfaces of the upper header 400 and the lower header 500 facing each other.

That is, the bobbin seating grooves 450 and 550 may be concavely formed in the upper header 400 and the lower header 500, respectively, in order to fix a position of the bobbin 600 in the horizontal direction, and the coil support portions 620 may be inserted and seated into the bobbin seating grooves 450 and 550.

In addition, heating element coupling grooves 460 and 560 into which end portions of the heating element 310 are inserted and coupled may be formed, respectively, in the surfaces of the upper header 400 and the lower header 500 facing each other.

Likewise, the heating element coupling grooves 460 and 560 may be concavely formed in the upper header 400 and the lower header 500, respectively, in order to fix a position of the heating element 310 in the horizontal direction, and the heating element 310 may be inserted and coupled into the heating element coupling grooves 460 and 560.

In addition, the body 100 may include support portions 120 protruding from the surfaces of the body 100 in the width direction in the concavely formed inner surface to support the induction coil 300, the housing 200 may have a form in which a pipe formed to be elongate in the height direction and having both ends in the vertical direction that are closed is vertically cut in half, and the inlet pipe and the outlet pipe may be formed at the housing 200. Alternatively, the inlet pipe and the outlet pipe may be formed at the body.

In addition, the heating element 310 may be formed of a ferrite-based material having very high magnetic permeability so that heat may be generated well in an induction manner, and an example of the ferrite-based material may include STS 430 among stainless steels. In addition, the heating element 310 may be formed of a material having an electrical resistance higher than that of the induction coil 300. In addition, in order to allow the air bubbles to be easily discharged from the coolant, a direction in which the coolant exchanging the heat with the heating element 310 flows may be a vertical upward direction, and may be inclined within an angle range smaller than 90 degrees with respect to the vertical upward direction. That is, the heating element 310 and the bobbin 600 may be formed in parallel with each other and be disposed at an angle smaller than 90 degrees with respect to the vertical direction to allow the coolant to be introduced from the lower side and be discharged to the upper side. In addition, the heating element 310 and the bobbin 600 may be disposed to form a concentric circle, thereby allowing the coolant passing through the space between the heating element 310 and the bobbin to be uniformly distributed and flow.

FIG. 9 is a configuration diagram illustrating an induction heater including an induction heater control device according to the present invention, and FIG. 10 is graphs illustrating physical property change characteristics depending on a temperature of a heating element according to the present invention.

As illustrated, an induction heater 1000 according to another exemplary embodiment of the present invention may be configured to include an induction coil 300; a heating element 310 inductively heated by the induction coil 300; and an induction heater control device 800 connected to the induction coil 300 and a vehicle power supply 830 to supply power to the induction coil 300 or block power supplied to the induction coil 300 and performing a control so that the heating element 310 is inductively heated, wherein the induction heater control device 800 is configured to include one or more of a current sensor 810 sensing a current flowing in the induction coil 300 and a temperature sensor 820 sensing temperatures of the switching elements (insulated gate bipolar mode transistor (IGBTs)) 730 controlling a current supplied to the heating element 310.

First, the induction heater 100 may have various forms in which the heating element 310 may be inductively heated when alternating current (AC) power is supplied to the induction coil 300. For example, as illustrated in FIGS. 3 to 7, the induction coil 300 and the heating element 310 may be disposed in the internal space formed by the coupling between the body 100 and the housing 200, the inlet pipe 210 into which the coolant is introduced and the outlet pipe 220 through which the coolant discharged may be formed in the housing 200, and the coolant may flow in the housing 200. In addition, the induction coil 300 may be wound around and fixed to the bobbin 600 having the cylindrical shape, the upper header 400 may be coupled to an upper side of the bobbin 600 around which the induction coil 300 is wound, and the lower header 500 may be coupled to a lower side of the bobbin 600 around which the induction coil 300 is wound, such that the upper header 400 and the lower header 500 may be coupled to the body 100 and the housing 200. In addition, a controller may be provided in the body 100 to switch and control the power supplied to the induction coil 300, thereby allowing the heating element 310 to be inductively heated. In this case, the controller may be the substrate 720, the switching elements (the IGBTs) 730 that may switch the power supplied to the induction coil 300 may be formed on the substrate 720, and a microprocessor that may be connected to the switching elements 730 and control the switching elements 730 may be formed on the substrate 720.

In addition, the induction heater control device 800 may be connected to the induction coil 300 and the vehicle power supply 830, and heater power may be supplied to the induction coil 300 or heater power supplied to the induction coil 300 may be blocked by the induction heater control device 800. Therefore, the control may be performed so that the heating element 310 is inductively heated.

Here, the induction heater control device 800 may include one or more of the current sensor 810 sensing the current flowing in the induction coil 300 and the temperature sensor 820 sensing the temperatures of the switching elements (the IGBTs) 730 controlling a current supplied to the heating element 310. That is, the current sensor 810, which is a means capable of sensing the current flowing in the induction coil 300, may be, for example, a hall sensor, and may be installed on a power supply line connecting the vehicle power supply 830 and the induction coil 300 to each other or be mounted on a high voltage circuit of the substrate 720. In addition, the temperature sensor 820, which is a means sensing the temperatures of the switching elements 730 capable of switching and controlling the current supplied to allow the heating element 310 to be inductively heated, may be installed in the switching elements 730 or be installed adjacent to the switching elements 730.

Therefore, when the heating element is overheated due to occurrence of a situation in which a flow rate of the coolant exchanging heat while passing through the induction heater is excessively small or the coolant does not flow, the current flowing in the induction coil 300 is changed. In this case, the change in the current may be sensed by the current sensor to recognize whether or not the heating element is overheated. In addition, when the heating element is overheated, temperatures of the body and the housing in which the heating element is accommodated and the substrate provided at one side of the body rise. In this case, a large amount of heat is generated in the switching elements formed on the substrate, and the temperatures of the switching elements may thus become relatively highest. Therefore, the temperatures of the switching elements may be sensed by the temperature sensor to recognize whether or not the heating element is overheated. That is, when the heating element is not overheated in a situation in which the coolant normally flows, the switching elements may also be cooled, such that the temperatures of the switching element may not rise to a specific temperature or more or may not rapidly rise.

As described above, the induction heater according to the present invention may be controlled so as not to be overheated using the current sensor capable of sensing the overheating of the heating element as illustrated in FIG. 11, using the temperature sensor instead of the current sensor, or using both of the current sensor and the temperature sensor, resulting in prevention of a fault of the induction heater and a fire due to the overheating.

In addition, the heating element 310 may be formed of a ferrite-based metal having a Curie temperature.

That is, the heating element 310 may be formed of a ferrite-based metal having very high magnetic permeability so that heat may be generated well in the induction heating manner. As an example, a STS 430-based metal among stainless steels may be used as the ferrite-based metal. Preferably, the heating element 310 may be formed of an STS430 material. In addition, the heating element 310 may be formed of a material having an electrical resistance higher than that of the induction coil 300. In this case, when the heating element 310 formed of the ferrite-based metal having the Curie temperature is heated, such that a temperature of the heating element 310 rises, a physical property of the heating element may be rapidly changed at the Curie temperature, which is a specific temperature. That is, it may be seen from the graphs illustrated in FIG. 10 that as the temperature of the heating element rises, a consumed current depending on an output duty supplied to the induction coil 300 is gradually decreased linearly and is rapidly increased on the basis of the Curie temperature and a graph for an AC resistance is opposed to that of the consumed current.

Therefore, the heating element 310 may be formed of the ferrite-based metal having the Curie temperature, and the rapid change in the consumed current at the Curie temperature may be sensed to recognize whether or not the heating element is overheated.

In addition, the temperature sensor 820 included in the induction heater control device 800 may be mounted adjacent to a switching element disposed on an upper portion of the substrate 720 or a switching element close to a central portion of the heating element 310.

That is, referring to FIG. 5, a plurality of switching elements 730 may be provided on the substrate 720, and since the upper portion of the substrate 720 or the central portion of the heating element 310 may have the highest temperature, the temperature sensor 820 may be mounted adjacent to the switching elements of which the temperatures may become highest. As an example, the temperature sensing mean 820 may be directly mounted on the switching element coupled to the substrate 720, be mounted on a collector having the highest temperature in the switching element, be mounted on the substrate 720 to which the switching element is coupled, or be mounted on a portion of the substrate to which the collector of the switching element is coupled. Alternatively, in the case in which the switching element is closely adhered to the body 100, the temperature sensor 820 may be mounted on the body 100 so as to be adjacent to a portion of the switching element closely adhered to the body 100. Particularly, in the case in which the heating element 310 has a form of a pipe penetrated in the vertical direction and is configured so that the coolant is introduced from the lower side of the heating element and is discharged to the upper side, the upper portion of the substrate or the central portion of the heating element may have the highest temperature, and the temperature sensor may thus be mounted adjacent to the switching element disposed on the upper portion of the substrate or the central portion of the heating element.

In addition, the induction heater control device 800 may further include an overcurrent blocking fuse 860 mounted on a high voltage line connecting the vehicle power supply 830 and the induction coil 300 to each other.

That is, when a fault occurs in the current sensor 810 or the temperature sensor 820 or a fault occurs in the controller, such that the heating element 310 is overheated, the power supplied to the induction coil 300 may be physically blocked by the overcurrent blocking fuse 860. In this case, various fuses that may be broken to block the power when a current equal to or larger than a specific current flows therein may be used as the overcurrent blocking fuse 860. In addition, referring to FIG. 12, the overcurrent blocking fuse 860 may be mounted on the high voltage line connecting the vehicle power supply 830 and the induction coil 300 to each other, be mounted on a high voltage circuit of the substrate 720 on which the high voltage line is formed, or be mounted adjacent to the vehicle power supply 830.

In addition, the induction heater control device 800 may further include a temperature blocking fuse 870 mounted on a low voltage line connected to an operation power supply of the controller performing a control so that the heating element 310 is inductively heated; and a temperature sensing portion 871 connected to the temperature blocking fuse 870 and sensing a temperature of the coolant exchanging the heat with the heating element 310.

That is, when a fault occurs in the current sensor 810 or the temperature sensor 820 or a fault occurs in the controller, such that the heating element 310 is overheated, operation power of the controller may be physically blocked by the temperature blocking fuse 860. In this case, as illustrated in FIG. 13, the temperature sensing portion 871 sensing a temperature may be connected to the temperature blocking fuse 870, and may be mounted to be in thermal contact with various positions in order to sense the temperature of the coolant exchanging the heat with the heating element 310. Therefore, when a temperature equal to or larger than a specific temperature is sensed by the temperature sensing portion 871, the temperature blocking fuse 870 may be broken to block the operation power, and the temperature blocking fuse 870 may be mounted so as to be connected in series with the low voltage line connected to the operation power supply of the controller performing the control so that the heating element 310 is inductively heated, thereby allowing a low voltage circuit of the substrate 720 formed on the low voltage line to be opened when an abnormal temperature is sensed. Therefore, when the heating element is overheated, the controller itself performing the control so that the heating element is inductively heated may not be operated to allow the heating element not to be inductively heated, resulting in prevention of a fire due to the overheating of the heating element.

In addition, a method for controlling overheating of an induction heater according to the present invention is a method for controlling overheating of an induction heater heating a coolant in an induction manner, and may be configured to include deciding whether or not the heating element 310 is overheated by sensing one or more of the temperatures of the switching elements (the IGBTs) 730 controlling the current flowing in the induction coil 300 and the current supplied to the induction coil 300 (S10); and performing a control to supply the power to the induction coil 300 or block the power supplied to the induction coil 300 depending on whether or not the heating element 310 is overheated (S20).

That is, as described above in the induction heater 100 according to the exemplary embodiment of the present invention, it may be decided whether or not the induction heater is overheated using the current sensor 810 or the temperature sensor 820 capable of sensing the overheating of the heating element 310 or using both of the current sensor 810 and the temperature sensor 820, and the power supplied to the induction coil 300 may be controlled depending on a decision result, resulting in prevention of the fault of the induction heater and the fire due to the overheating.

In addition, it is possible to perform a control to prevent the overheating of the induction heater using the heating element 310 formed of the ferrite-based metal having the Curie temperature.

That is, it is possible to perform a control to prevent the overheating of the induction heater by sensing that the consumed current is rapidly changed in the vicinity of the Curie temperature using characteristics of the heating element 310 formed of the ferrite-based metal having the Curie temperature corresponding to the specific temperature at which the physical property is rapidly changed, as described above.

In addition, when a ratio of a current current Ic, which is a current consumed current flowing in the induction coil 300, to a normal current In, which is a consumed current in a normal state supplied to the induction coil 300, becomes smaller than a preset value or is decreased in a ratio larger than a predetermined ratio, it may be decided that the heating element 310 is overheated, and the control may be performed to block the power supplied to the induction coil 300.

That is, since the consumed current is decreased as the temperature of the heating element rises in a temperature range of the heating element from a temperature of a normal operation state to a temperature at which overheating is being generated as in the graph illustrated in FIG. 10, as illustrated in FIG. 14, in the case in which the ratio of the current current Ic, which is the current consumed current flowing in the induction coil 300, to the normal current In, which is the consumed current in the normal state, becomes smaller than the preset value, it may be decided that the overheating is being generated, and the power supplied to the induction coil 300 may be blocked to prevent the heating element from being overheated. Alternatively, when the ratio of the current current Ic to the normal current In is decreased in the ratio larger than the predetermined ratio, it may be decided that the overheating is being generated, and the power supplied to the induction coil 300 may be blocked. In this case, the normal current In may be an average current. In addition, as illustrated, in the case in which an absolute value of a value obtained by dividing a difference between the normal current and the current current by the current current is larger than a first set value e1 that is preset or the current current is smaller than the product of the normal current and a second set value e2 that is preset, it may be decided that the overheating is generated, an overheating error message may be output to an air conditioning controller 840 of a vehicle, and power of the induction heater may then be allowed to be turned off.

In addition, when a ratio of a current temperature Tc, which is a current temperature of the switching element 730, to a normal temperature Tn, which is a temperature of the switching element 730 in a normal state, becomes higher than a preset value or is increased in a ratio larger than a predetermined ratio, it may be decided that the heating element 310 is overheated, and the power supplied to the induction coil 300 may be blocked.

That is, as illustrated, in the case in which the ratio of the current temperature Tc, which is the current temperature, to the normal temperature Tn becomes higher than the preset value, it may be decided that the overheating is being generated, and the power supplied to the induction coil 300 may be blocked to prevent the heating element from being overheated.

Alternatively, when the ratio of the current temperature Tc to the normal temperature Tn is increased in the ratio larger than the predetermined ratio, it may be decided that the overheating is being generated, and the power supplied to the induction coil 300 may be blocked. In this case, the normal temperature Tn may be an average temperature. In addition, as illustrated, in the case in which an absolute value of a value obtained by dividing a difference between the normal temperature and the current temperature by the current temperature is larger than a third set value e3 that is preset or the current temperature is higher than the product of the normal temperature and a fourth set value e4 that is preset, it may be decided that the overheating is generated, an overheating error message may be output to the air conditioning controller 840 of the vehicle, and the power of the induction heater may then be allowed to be turned off.

In addition, when the current flowing in the induction coil 300 arrives at a preset limit current Is, the overcurrent blocking fuse 860 mounted on the high voltage line connecting the vehicle power supply 830 and the induction coil 300 to each other may be broken to block the power supplied to the induction coil 300.

That is, when the fault occurs in the current sensor 810 or the temperature sensor 820 or the fault occurs in the controller in a state in which the overheating of the heating element is being generated, such that a control may not be performed so that the heating element 310 is not overheated, the power supplied to the induction coil 300 may be physically blocked by the overcurrent blocking fuse 860. In this case, the overheating of the heating element may be prevented by allowing the overcurrent blocking fuse 860 to be broken by the consumed current rapidly increased in the vicinity of the Curie temperature as illustrated in the graph or allowing the overcurrent blocking fuse 860 to be broken when the current flowing in the induction coil 300 arrives at the preset limit current Is.

In addition, when the temperature of the coolant exchanging the heat with the heating element 310 arrives at a preset limit temperature Ts, the temperature blocking fuse 870 mounted on the low voltage line connected to the operation power supply of the controller performing the control so that the heating element 310 is inductively heated may be broken to allow the heating element 310 not to be inductively heated.

That is, when the fault occurs in the current sensor 810 or the temperature sensor 820 or the fault occurs in the controller in a state in which the overheating of the heating element is being generated, such that a control may not be performed so that the heating element 310 is not overheated, the operation power of the controller performing the control so that the heating element 310 is inductively heated may be physically blocked by the temperature blocking fuse 870. In this case, the temperature blocking fuse 870 may sense the temperature, break the low voltage circuit connected to the operation power supply when the temperature arrives at the limitation temperature Ts, thereby allowing the heating element not to be inductively heated to prevent the heating element from being overheated, and may be again connected when the temperature becomes a specific temperature lower than the limit temperature Ts, thereby allowing the controller to be operated.

As described above, in the case in which the fault occurs in the sensing means sensing that the induction heater is overheated or the controller performing the control so that the heating element is inductively heated, the power may be physically blocked or the power of the controller may be physically turned off to allow the inductive heating is not generated, resulting in prevention of the fault of the induction heater or the fire due to the overheating even when the fault occurs in the sensing means or the controller.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

1000: induction heater
100: body
110: guide groove
120: support portion
200: housing
210: inlet pipe
220: outlet pipe
230: fixing groove
300: induction coil
310: heating element
400: upper header
410: coolant discharge hole
420: auxiliary discharge hole
430: flow adjusting portion
440: bobbin coupling groove
450: bobbin seating groove
460: heating element coupling groove
500: lower header
510: coolant introduction hole
520: auxiliary introduction hole
530: flow adjusting portion
540: bobbin coupling groove
550: bobbin seating groove
560: heating element coupling groove
600: bobbin
610: cylindrical portion
620: coil support portion
630: protrusion portion
700: control portion
710: control portion case
720: substrate
730: switching element (IGBT)
740: control portion cover
A1: inlet side tank portion
A2: outlet side tank portion
B1: coolant flow region
B2: coolant congestion region
800: induction heater control device
810: current sensor
820: temperature sensor
830: vehicle power supply
840: air conditioning controller
860: overcurrent blocking fuse
870: temperature blocking fuse

The invention claimed is:

1. An induction heater comprising:
a body;
a housing coupled to a side surface of the body;
an upper header and a lower header provided in an internal space formed by the coupling between the body and the housing, disposed at upper and lower ends of the internal space, respectively, so as to be spaced apart from each other in a height direction, and coupled to one or more of the body and the housing;
a bobbin formed in a cylindrical shape and having opened both ends coupled to and supported by the upper header and the lower header, respectively;
an induction coil wound around an outer surface of the bobbin; and
a heating element formed in a cylindrical shape, having opened both ends coupled to and supported by the upper header and the lower header, respectively, and disposed inside the bobbin while being spaced apart from an inner surface of the bobbin, wherein a coolant introduced into an inlet pipe formed at a lower side of the housing sequentially passes through a lower side of the lower header, a coolant introduction hole disposed in the lower header, a space between the heating element and the bobbin, a coolant discharge hole of a coolant discharge hole disposed in the upper header, and an upper side of the upper header, and is then discharged through an outlet pipe formed at an upper side of the housing, wherein the upper header and the lower header are formed to partially close a coolant passage between the heating element and the bobbin.

2. The induction heater of claim 1, wherein guide grooves are concavely formed in a horizontal direction in a concave inner surface of the body, and the upper header and the lower header are inserted along and coupled to the guide grooves.

3. The induction heater of claim 1, wherein fixing grooves are concavely formed in a horizontal direction in a concave inner surface of the housing, and the upper header and the lower header are inserted and coupled into fixing groove.

4. The induction heater of claim 1, wherein the coolant discharge hole formed in the upper header and the coolant introduction hole formed in the lower header are formed inside the bobbin when viewed from the top or the bottom, and extends from a position radially spaced from the bobbin to an outer peripheral surface of the heating element, or beyond the outer peripheral surface of the heating element.

5. The induction heater of claim 1, wherein the coolant discharge hole formed in the upper header and the coolant introduction hole formed in the lower header are formed over an inner region and an outer region of the heating element when viewed from the top or the bottom.

6. The induction heater of claim 1, wherein flow adjusting portions and closing portions of an inner region of the heating element when viewed from the top or the bottom are formed in the upper header and the lower header, respectively.

7. The induction heater of claim 1, wherein the bobbin includes coil support portions formed from an outer peripheral surface of a cylindrical portion in an outer radial direction at both ends of the cylindrical portion in a vertical direction.

8. The induction heater of claim 7, wherein the bobbin includes protrusion portions protruding from the coil support portions in the height direction, and the protrusion portions are inserted and coupled into bobbin coupling holes and formed, respectively, in the upper header and the lower header.

9. The induction heater of claim 7, wherein bobbin seating grooves into which the coil support portions of the bobbin are inserted and seated are formed, respectively, in surfaces of the upper header and the lower header facing each other.

10. The induction heater of claim 1, wherein heating element coupling grooves into which end portions of the heating element are inserted and coupled are formed, respectively, in surfaces of the upper header and the lower header facing each other.

11. The induction heater of claim 1,
wherein the heating element inductively heated by the induction coil,
the induction heater further comprising:
an induction heater control device connected to the induction coil and a vehicle power supply to supply power to the induction coil, or block power supplied to the induction coil, and performing a control so that the heating element is inductively heated,
wherein the induction heater control device is configured to include one or more of a current sensor sensing a current flowing in the induction coil and a temperature sensor sensing temperatures of switching elements (insulated gate bipolar mode transistor (IGBTs)) controlling a current supplied to the heating element.

12. The induction heater of claim 11, wherein the heating element is formed of a ferrite-based metal having a Curie temperature.

13. The induction heater of claim 11, wherein the temperature sensor of the induction heater control device is mounted adjacent to a switching element disposed on an upper portion of the substrate or a switching element close to a central portion of the heating element.

14. The induction heater of claim 11, wherein the induction heater control device further includes an overcurrent blocking fuse mounted on a high voltage line connecting the vehicle power supply and the induction coil to each other.

15. The induction heater of claim 11, wherein the induction heater control device further includes a temperature blocking fuse mounted on a low voltage line connected to an operation power supply of a controller performing a control so that the heating element is inductively heated; and a temperature sensing portion connected to the temperature blocking fuse and sensing a temperature of a coolant exchanging heat with the heating element.

* * * * *